Oct. 16, 1934.  R. B. GRIMES  1,976,989
PORTABLE ROASTING OVEN
Filed Dec. 17, 1932
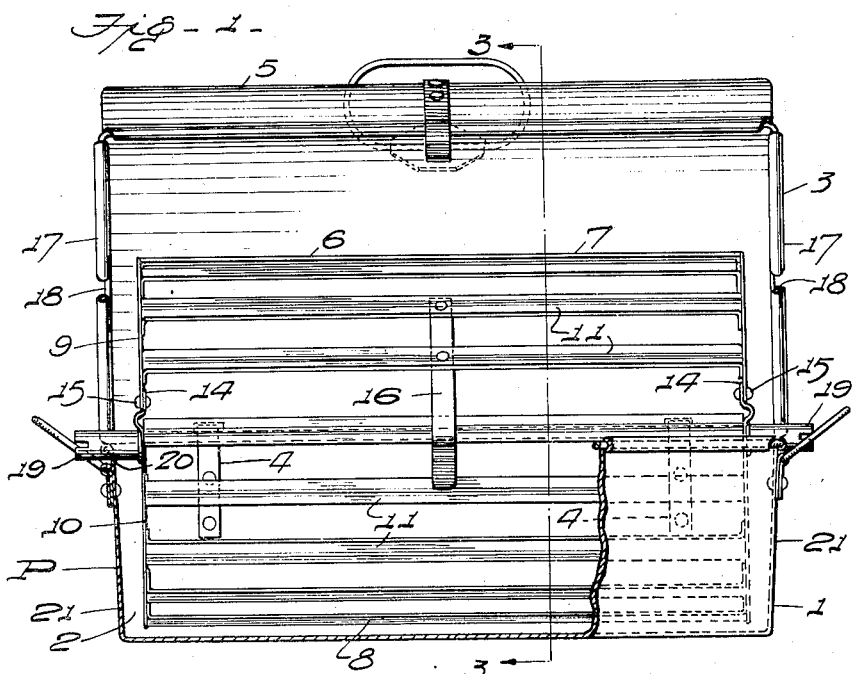
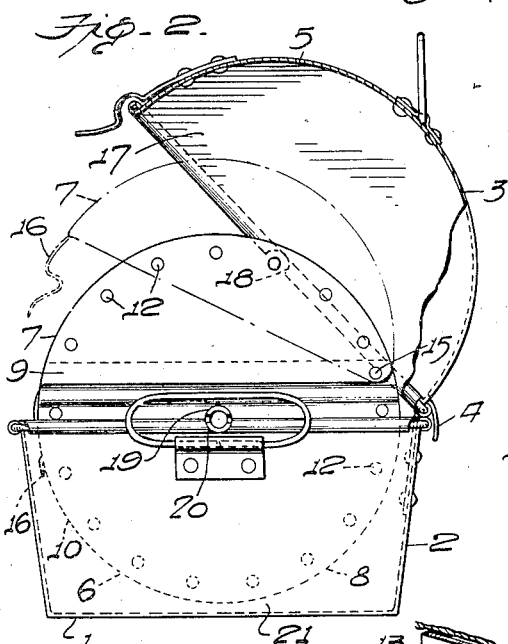
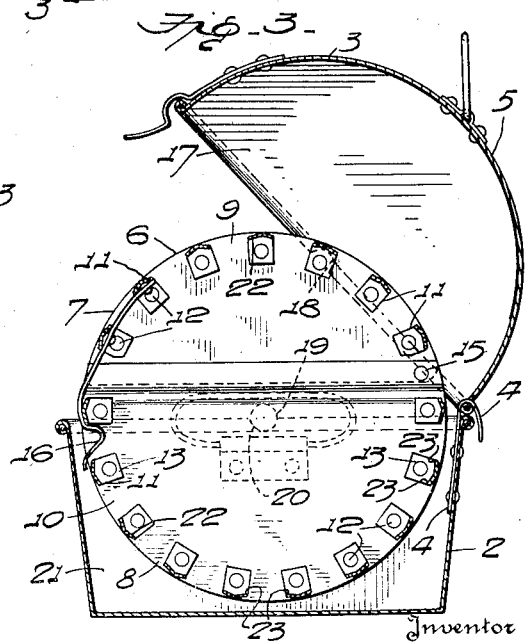
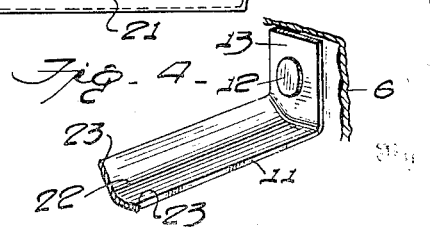

Patented Oct. 16, 1934

1,976,989

UNITED STATES PATENT OFFICE 1,976,989

PORTABLE ROASTING OVEN

Robert B. Grimes, Phoenix, Ariz., assignor of one-half to Conrad A. McGlamery, Tucson, Ariz.

Application December 17, 1932, Serial No. 647,778

1 Claim. (Cl. 53—5)

This invention relates to certain new and useful improvements in portable roasting ovens or pans primarily for household use, and has for its object to provide a device of this character in which the meat or fowl will be automatically basted during the cooking operation, thus obviating the necessity of opening the pan from time to time for this purpose.

Another object of the invention is to provide a device of the kind above mentioned, embodying a rotary meat holding cage or frame, to which the meat will not stick with consequent burning effect.

Other objects and advantages of the invention will be apparent as the description is considered in connection with the accompanying drawing, in which:

Figure 1 is a front elevation partly in section;

Figure 2 is an end view of Figure 1;

Figure 3 is a section on the line 3—3 of Figure 1; and

Figure 4 is a detail view of the cage.

Referring more particularly to the drawing wherein like reference numerals refer to corresponding parts throughout the several views P denotes a sheet metal pan of rectangular shape, to a rear wall 1 of a base portion 2 of which a cover 3 is hingedly connected, as at 4. The top wall 5 of this cover is curved to accommodate the upper half of a meat holding cage 6, about to be described. The opposing edges of the base 2 and the cover 3 are adapted to form a substantially steam tight joint.

The cage 6 comprises upper and lower sections 7 and 8, having semi-circular sheet metal end walls 9 and 10, respectively. Extending between and connected at opposite ends to the end walls 9 and 10 are a plurality of spaced horizontally disposed bars 11. Rivets or other suitable fasteners 12, extending through registering openings formed in the bent end portions 13, of the bars and in the curved edges of the end walls 9 and 10, secure the bars 11 in place. The end walls 10, of the lower section 8, of the cage 6, are slightly offset inwardly as at 14, to receive the lower edges of the end walls 9, of the upper section, in overlapping relation. Pivot pins 15, pivotally connect the two cage sections together and a spring finger or latch member 16, normally maintains the top section in closed position. The semi-circular end walls 9 and 10 thus become discs, in effect, and the whole cage becomes a foraminous cylinder.

Formed in upper edges of the end walls 17 of the pan P are shallow semi-circular openings or notches 20, which rotatably receive and serve as bearing openings for stub shafts 19, suitably fixed to and projecting outwardly from the end walls 10. Similar notches 18 formed in the lower edges of the end walls 21 of the pan cover 3, register with the notches 18 when the cover is closed. The dimensions of the pan and its cover are such that the cage will be snugly enclosed but with sufficient clearance at all points to rotate freely therein.

It will be noted that the inner faces of the bars 11 are concave or substantially V-shaped to provide longitudinal pockets 22 extending from end to end thereof and each adapted to cup up approximately a tablespoon of water or other basting liquid from the bottom of the pan, during rotation of the cage in either clockwise or anti-clockwise direction. This automatic action of the bars obviates the necessity of frequently opening the pan to manually baste the meat or fowl and consequently cooking is effected quickly and with a minimum consumption of fuel. The side edges 23 of the concave bars also provide a two point contact with the meat roast thus preventing sticking and burning. Liquid scooped up from the bottom of the pan by the bars and the essence which exudes from the meat into the pockets 22, and which finally drops onto the meat, also tends to prevent the meat from being forced into the pockets and flattened against the face of the bars.

In practice the meat or fowl is placed in the cage and the pan placed in the oven of a domestic stove or for some uses it may be suitably supported above a fire or fire box, not shown. After cooking has continued for some time the cage is rotated until the meat has been basted by water or other basting liquids scooped up by bars 11 from the bottom of the pan. To facilitate rotation of the cage, one of the stub shafts 19 is preferably slotted to receive a long key, not shown. Liquid picked up by the concave bars from the bottom of the pan and the meat juice escaping directly from the meat into the pockets 22 will in large part escape from the pockets and trickle downwardly over the meat with beneficial results, as the cage is rotated. However considerable juice will be trapped in the pockets due to the sealing action of the meat at various points of contact, and some of this trapped liquid will be again taken up by the meat. In order to thoroughly baste the meat or fowl it is merely necessary to revolve the cage but once or twice during the cooking operation. Consequently where the pan is being used in the oven of a domestic stove, little heat is lost during the few seconds the oven door must remain open.

Having thus described my invention:

What I claim as new is:

A device of the character described comprising a pan, a meat supporting cage rotatably mounted in said pan, said cage comprising upper and lower sections, such sections having semi-circular end walls pivotally connected together, the end walls of one section being slightly offset to receive the edges of the end walls of the other section in overlapping relation, means for normally maintaining the upper section in closed position, said cage including a plurality of spaced meat supporting bars extending between said semi-circular end walls for successively scooping liquid from the bottom of the pan and discharging same during rotation of the cage in either clockwise or anti-clockwise direction, the side edges of said bars extending inwardly to form a substantially V-shaped pocket extending from end to end thereof and to present a two point contact to the meat to prevent the latter from flattening out against the inner face of the bars.

ROBERT B. GRIMES.